(12) United States Patent
Gritzo

(10) Patent No.: US 6,668,277 B1
(45) Date of Patent: Dec. 23, 2003

(54) WEB-BASED MULTI-CHANNEL ANALYZER

(75) Inventor: Russ E. Gritzo, Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/953,116

(22) Filed: Sep. 14, 2001

(51) Int. Cl.[7] .............................................. G06F 13/00
(52) U.S. Cl. ...................... 709/217; 709/319; 709/329; 324/312; 250/363.01
(58) Field of Search ................................ 709/217, 219, 709/236, 238, 246, 250, 319, 329; 378/62, 64; 324/307, 312; 250/363.01

(56) References Cited

U.S. PATENT DOCUMENTS

| | | | |
|---|---|---|---|
| 5,528,495 A | 6/1996 | Roscoe | 364/422 |
| 5,694,933 A * | 12/1997 | Madden et al. | 250/363.02 |
| 5,772,963 A | 6/1998 | Cantatore et al. | 422/67 |
| 5,857,463 A * | 1/1999 | Thurston et al. | 250/336.1 |
| 6,061,582 A * | 5/2000 | Small et al. | 600/316 |
| 6,111,929 A | 8/2000 | Hazlett | 378/45 |
| 6,207,957 B1 | 3/2001 | Kammeraad et al. | 250/370.1 |
| 6,362,472 B1 * | 3/2002 | Yarnall et al. | 250/252.1 |
| 6,362,620 B1 * | 3/2002 | Debbins et al. | 324/309 |
| 6,453,004 B1 * | 9/2002 | Albeniz et al. | 378/62 |

OTHER PUBLICATIONS

"X–Ray and Gamma Ray Detector High Resolution CZT Cadmium Zinc Telluride", web pages, amptek.com, Apr. 11, 2001, 8 pages.

"Charge Trapping in XR–100T–CZT Detectors Application Note", web pages, amptek.com, Apr. 18, 2001, 15 pages.

* cited by examiner

Primary Examiner—Viet D. Vu
(74) Attorney, Agent, or Firm—Madson & Metcalf (57) ABSTRACT

The present invention provides an improved multi-channel analyzer designed to conveniently gather, process, and distribute spectrographic pulse data. The multi-channel analyzer may operate on a computer system having memory, a processor, and the capability to connect to a network and to receive digitized spectrographic pulses. The multi-channel analyzer may have a software module integrated with a general-purpose operating system that may receive digitized spectrographic pulses for at least 10,000 pulses per second. The multi-channel analyzer may further have a user-level software module that may receive user-specified controls dictating the operation of the multi-channel analyzer, making the multi-channel analyzer customizable by the end-user. The user-level software may further categorize and conveniently distribute spectrographic pulse data employing non-proprietary, standard communication protocols and formats.

46 Claims, 4 Drawing Sheets

WEB-BASED MULTI-CHANNEL ANALYZER

GOVERNMENT RIGHTS

This invention was made with Government support Contract Number W-7405-ENG-36 awarded by the United States Department of Energy to the Regents of the University of California. The Government has certain rights in the invention.

BACKGROUND OF THE INVENTION

1. The Field of the Invention

The present invention relates to systems and methods for processing and distributing spectrographic pulse data, and more particularly, to a multi-channel analyzer for conveniently acquiring, processing, and distributing spectrographic pulse data over a computer network.

2. The Relevant Technology

Radioactive materials are unstable and emit radiation in the form of alpha, beta, gamma, or X-rays. Many different types of radiation detectors have been designed and manufactured to produce data corresponding to radiation emitted by radioactive materials.

One type of radiation detector is a pulse-mode detector, in which a separate electrical pulse is generated for each individual radiation quantum (e.g., a gamma ray) that interacts with a detector. A high-purity germanium detector, which is often cooled by liquid nitrogen, is one example of a pulse-mode detector. By way of example, a gamma ray interacts with a detector surface coupled to a cathode and an anode. A portion of the energy of the gamma ray may be deposited on the detector to produce a charge. From the point of interaction, freed electrons drift towards the anode and ions (or holes) drift towards the cathode. A signal relating to the produced charge is often captured and manipulated by charge-sensitive preamplifiers and shaping amplifiers, resulting in a voltage pulse. The peak amplitude of such a voltage pulse is proportional to the energy deposited on a detector by a gamma ray.

Analog-to-digital converters (ADCs) are frequently employed to generate a digital number indicating the height, or the amplitude, of each voltage pulse. Such digital pulse data may be gathered and analyzed to learn more about the corresponding radioactive material. For example, the digitized pulse data may be categorized into channels, each channel indicating a specific energy level range into which the amplitude of the pulse falls. Energy levels are often measured in kiloelectron volts (KeVs). Devices that analyze multiple channels of pulse data are called multi-channel analyzers. Pulse data is often displayed on a chart showing the number of pulses (or counts) that the detector receives at a specific energy level range.

These charts frequently show a series of consecutive energy level ranges and a number of counts received in each range. By analyzing count patterns created thereby, experts in the field may make determinations regarding the corresponding radioactive material. Such determinations may be made by automated analysis algorithms, a visual inspection, or a combination of the two. The count patterns may reveal thickness, age, density, presence, or other characteristics of a corresponding radioactive material.

This technology is useful in a number of different fields. For example, national security requires detection and analysis of illegally transported or used radioactive materials. The food industry may monitor the radiation levels of irradiated food, such as meat, fruit, or vegetable products that have been subjected to low doses of gamma or X-rays to control food borne pathogens. Plainly, the nuclear power industry is also interested in monitoring radiation levels in and around nuclear power plants or nuclear waste disposal sites to prevent human, animal, or environmental exposure to radiation. For the same reasons, environmentalists and consumer-health advocates are similarly concerned about detecting radioactive materials.

Radioactive materials frequently produce pulses (e.g., gamma rays) at very high rates, often in excess of 10,000 pulses per second. Capturing each pulse, or a large percentage of the pulses, may be important in analyzing the corresponding radioactive material. If a large number of pulses have been missed, the corresponding pulse height data may be misleading and could lead to a failure to recognize or correctly identify a radioactive substance. These errors could produce serious adverse consequences, resulting in breaches in national security, contaminated food, or human exposure to radioactive substances.

In order to achieve high pulse capture rates and low probability of missed pulses, dedicated hardware devices were developed and coupled with special-purpose control software running on application-specific operating system software. Experts in the field have long believed that a general-purpose operating system could not respond quickly enough to capture spectrographic pulse data at a high rate. Moreover, because of the extensive demands placed on these devices in gathering the pulse data, many such devices are not configured to perform other important tasks, such as processing and distributing pulse data. As such, conventional pulse data gathering systems provide proprietary software and a closed architecture that preclude cross-communications and operation in environments other than the proprietary environment.

As a consequence, interacting with and customizing such systems is extremely difficult. Proprietary communication protocols and formats are often employed, making it difficult or impossible to interact with these systems employing techniques, communication protocols and data formats used by general-purpose operating systems. Thus, interfacing with conventional systems creates substantial obstacles to distribution of the spectrographic pulse data through conventional techniques or protocols on a computer network. For example, conventional systems simply do not interface with UNIX or Macintosh systems. In addition, because conventional systems are proprietary, it is difficult or impossible for the user to customize such systems in accordance with the user's needs and wants.

Accordingly, a need exists for a multi-channel analyzer operating in conjunction with a general-purpose operating system that is capable of capturing rapidly produced spectrographic pulse data. A need additionally exists for a multi-channel analyzer that is configured such that standard network communication protocols and data formats used by general-purpose operating systems may be employed to access and distribute the spectrographic pulse data over a computer network. Moreover, it would be an advancement in the art to provide a multi-channel analyzer that is conveniently customizable by the end user. It would be a further advancement to provide a multi-channel analyzer that may be customized from remote locations.

BRIEF SUMMARY OF THE INVENTION

The present invention provides a Web-based multichannel analyzer (MCA) for conveniently processing and distributing spectrographic pulse data over a computer network. A Web-based MCA, in one embodiment, includes a standard single board computer, having memory and a processor and running an embedded general-purpose operating system, with added hardware to provide an interface to an external analog-to-digital converter (ADC). The Web-based MCA may further comprise software and hardware for interfacing with a network, such as the Internet. A general-purpose operating system enables convenient interaction with the Web-based MCA employing non-proprietary communication protocols and data formats.

In one embodiment, the Web-based MCA receives, or acquires, digitized pulse data through an input/output (I/O) card from an ADC. In one implementation, the ADC is integrated with a main board of the Web-based MCA and, thus, the Web-based MCA may directly receive and process analog pulse data.

One embodiment of this invention involves a kernel device driver for receiving and temporarily storing digitized pulse data received from the I/O card. The kernel device driver resides at the operating system's kernel level as a loadable kernel module. Thus, the kernel-level device driver is integrated with the operating system. The kernel device driver may be integrated with the general-purpose operating system. With an open-source operating system a user may customize the kernel-level module.

In one embodiment, the kernel-level module is capable of acquiring digitized pulse data for at least 10,000 pulses per second so that accurate spectrographic data may be obtained. To achieve this acquisition rate, the acquiring software module operates on the kernel-level. Programs operating in the user-space of an operating system are slower to respond to incoming signals. User-space programs are not integrated with the operating system, but instead are separate computer programs that run on an operating system and are subject to constraints imposed by the operating system. Thus, the operating system acts as an intermediary between user-space programs and corresponding computer hardware. Moreover, unless the operating system is open-source, the end-user would not have the legal right, and potentially the ability, to access and manipulate the source code so that a kernel-level module can be customized.

The kernel-level module may operate on an interrupt driven basis. That is to say, the Web-based MCA may perform other tasks (e.g., analyzing or distributing previously received spectrographic pulse data) until the kernel-level module receives a message indicating that the ADC has digitized pulse data. Upon receipt of the message, the processor of the Web-based MCA acknowledges the interrupt and executes the kernel level module code while other tasks are placed on hold. Receipt and processing of digitized pulse data is given priority, thus enabling the Web-based MCA to receive digitized pulse data at a high rate and yet still perform other tasks related to the analysis and distribution of spectrographic pulse data.

Moreover, the kernel-level module provides a buffer for temporarily storing digitized pulse data until other programs request the data. In one embodiment, the buffer may be dynamically sized so that digitized pulse data will not be lost or "dropped" during this interim period.

The kernel module further provides an interface to a user-space program so that digitized pulse data may be read and manipulated by a user-space program. In one embodiment, the kernel-level module provides a standard interface to user-space programs, enabling the user-space programs to be easily developed and implemented employing the digitized spectrographic pulse data produced by the kernel-level module. Thus, the Web-based MCA is easily customizable by an end-user, even from a remote location. A user-space program may categorize the digitized pulse data into channels (energy levels). The user-space program may further provide high-level controls enabling a user to customize and receive the categorized pulse data. In one embodiment, the user-space program may receive user-specified controls pertaining to gathering and distribution of spectrographic pulse data. The user-specified controls may control each aspect of the Web-based MCA. For example, the user-specified controls may dictate the rudimentary aspects of the MCA, including memory range control (number of channels), start and stop collect, clear data, and the like. Most importantly, the MCA accepts network socket connections and thus can be controlled by standard applications, such as Telnet. Employing these conventional, non-proprietary protocols, each aspect of the Web-based MCA is customizable by an end-user.

The user-space program may also format the categorized pulse data. In one embodiment, the categorized pulse data may be arranged into a non-proprietary format. One example of a non-proprietary format is Hypertext markup language (HTML), which language is frequently used in connection with Web pages on the World Wide Web. Non-proprietary formats are data formats or configurations that are not owned, controlled, or exclusively used by a particular entity or group of entities. In other words, the data may be accessed employing tools produced by multiple manufacturers. Such a system offers a number of advantages. For example, it is easier to distribute the data because recipients will often already have tools to view the information. Also, because one manufacturer is not the sole provider of the tools, costs are generally lower. Furthermore, existing networks, such as the Internet, may be employed to distribute information.

In one embodiment, the user-space program may also format the categorized pulse data into a visual indication thereof. The visual indication may comprise, for example, a static image of a chart having two axes and at least one point. One axis indicating a plurality of energy levels, and the other axis indicating a plurality of counts. Each point indicates the count (number of pulses) received at a specific energy level range. The visual indication may be formatted into a non-proprietary graphical file format, such as .png or .jpg graphical file.

A network adapter couples the Web-based MCA to a network, such as the Internet. The Web-based MCA may further comprise an e-mail agent, File Transfer Protocol (FTP) server, or Web server. Thus, after formatting, the user-space program may transmit the categorized pulse data to a network. In one embodiment, transmission may occur via non-proprietary transmission protocols. Non-proprietary transmission protocols are transmission protocols that are not owned, controlled, or exclusively used by a particular entity or group of entities. Thus, with the Web-based MCA, transmission may be effectuated by placing the categorized pulse data on a Web or File Transfer Protocol (FTP) server (either internal or external to the Web-based MCA), thus permitting transmission of the data employing a FTP or hypertext transfer protocol (HTTP). Spectrographic pulse data may also be transmitted with an e-mail message employing the e-mail agent. Again, the present invention represents a significant advancement in the art in that pulse data may be easily distributed among a number of different systems.

Thus, a conventional computer (i.e., having a processor, memory, and hardware and software for accessing the network) may be coupled to the network and access the categorized pulse data produced by the Web-based MCA. In one embodiment, a conventional Web browser may be employed to view categorized pulse data generated by the MCA. The Web-based MCA may further stream the pulse data through a transmission control protocol/internet protocol (TCP/IP), the networking protocol employed by the Internet, connection in real-time to such a conventional computer.

Also, a computer coupled to the network may generate and deliver the user-specified controls to be Web-based MCA. In one embodiment, the Web-based MCA may be controlled by a computer coupled to the network through a Telnet connection. Moreover, the Web server of the Web-based MCA may be configured with a common Gateway Interface (CGI) Gateway, enabling the end-user to employ a wide variety of scripts (e.g., C, PERL, Java, or HTML scripts) or applets (e.g., Java applets) to customize processing and delivery of the categorized pulse data.

Thus, the Web-based MCA provides a multi-channel analyzer operating in conjunction with a general-purpose operating system such that conventional means of interfacing with computer systems over a network may be employed to access, manipulate, and distribute the spectrographic pulse data. Moreover, the present invention is customizable by the end user from even remote locations.

The features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of this invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Throughout the following disclosure, the term "coupled" may be used to refer to components that are either directly connected or linked by one or more other components. Thus, as used herein, the term "coupled" may be synonymous with "in electrical communication with" or simply "in communication with."

Furthermore, those skilled in the art will understand that while many components described herein may be implemented as software modules, they may be also implemented as hardware or a combination of both hardware and software. The reverse is also true. Many hardware components may likewise be implemented as software components, or a combination of hardware and software components.

The Web-based multi-channel analyzer (MCA), in one embodiment, includes a standard single board computer, having a processor and memory and running an embedded operating system, such as a Linux operating system. The MCA may further include added hardware and software to provide an interface to a network and to an external analog-to-digital converter (ADC) or an onboard ADC. The Linux operating system is one example of a general-purpose, open-source operating system and other systems may be used. A general-purpose operating system, as opposed to a special-purpose operating system, is designed to operate in conjunction with a number of different software programs and to perform a number of different functions. For example, a general-purpose operating system may perform multiple and varied tasks, such as connecting to the Internet, running a spreadsheet program or a word processor program. Many conventional multi-channel analyzers, in contrast, employ dedicated hardware or special-purpose operating systems that were designed solely for the purpose of performing multi-channel analysis. Open-source operating systems make the source-code of the operating system available to the user, enabling the end-user to customize each aspect of the operating system.

Figure 1:
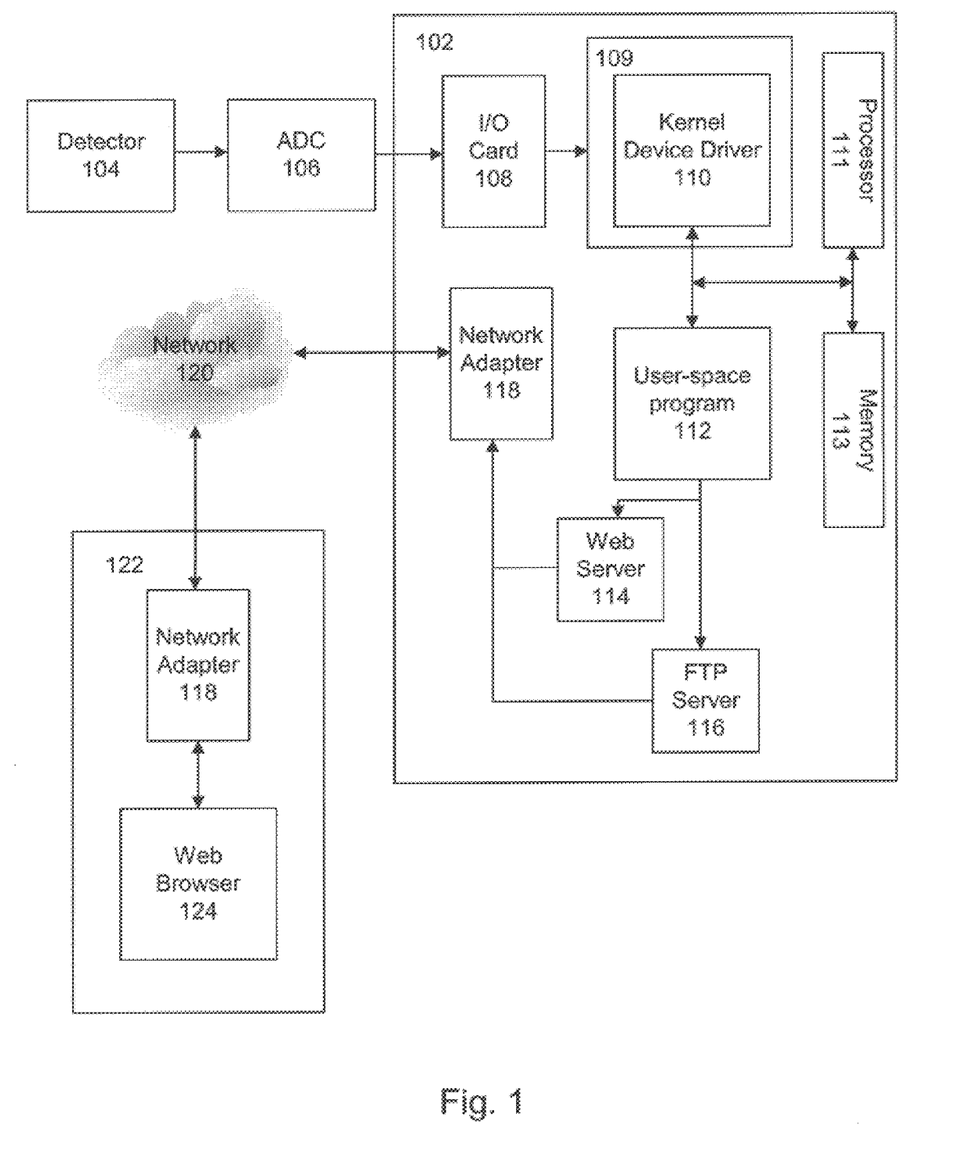
FIG. 1 is a schematic block diagram of a system in which the Web-based multi-channel analyzer may be employed.

FIG. 1 is a high-level schematic block diagram of a system in which the Web-based MCA 102 may be employed. A radiation detector 104 senses radioactive material and produces an analog pulse for each quantum of detected radiation (e.g., a gamma ray). The peak amplitude of the pulse is proportional to the energy deposited on a detector 104. The analog-to-digital converter (ADC) 106 digitizes the pulse data into a number indicating the peak amplitude of the received pulse. Typically, pulses are converted into numbers ranging from 0 to 65,000.

The Web-based MCA 102 receives, or acquires, the digitized pulse data through a conventional input/output (I/O) card 108. Input/output cards 108 are well known in the industry and understood by those skilled in the art. In one implementation, the ADC 106 is integrated with a main board of the computer in the Web-based MCA 102 and, thus, the Web-based MCA 102 may directly receive and process analog pulse data.

One embodiment of this invention involves a kernel-level device driver 110 that receives and temporarily stores digitized pulse data from the I/O card 108. The kernel device driver 110 resides at the operating system's kernel level as a loadable kernel software module. Hence, the kernel-level device driver 110 is integrated with the operating system. Preferably, the kernel device driver 110 is integrated with a general-purpose operating system, such as a Linux operating system 109, which, in one embodiment may be embedded. Moreover, an operating system, such as Linux 109, is open-source so that the user may customize even the kernel module 110.

The kernel-level module 110 operates on an interrupt driven basis. That is to say, the Web-based MCA 102 may perform other tasks (e.g., analyzing or distributing previously received spectrographic pulse data) until the kernel-level module 110 receives a message indicating that the ADC 106 has digitized pulse data. The kernel-level module 110 sends an interrupt to a processor 111 of the Web-based MCA 102, the processor 111 being coupled to memory 113, which may store commands executable by the processor 111. The other tasks are placed on hold. Receipt and processing of digitized pulse data is given priority, thus enabling the Web-based MCA 102 to receive digitized pulse data at a high rate and yet still perform other tasks related to the analysis and distribution of spectrographic pulse data.

In one embodiment, the kernel-level module 110 operating in conjunction with an embedded Linux operating system 109 is capable of acquiring digitized pulse data for at least 10,000 pulses per second so that accurate pulse data may be obtained. To achieve this acquisition rate, the acquiring software module operates on the kernel-level, i.e., programs operating in the user-space of an operating system are slower to respond to incoming signals than kernel-level programs. Moreover, unless the operating system is open-source, the end-user would not have the legal right, and potentially the ability, to access and manipulate the source code so that a kernel-level module 110 can be in customized.

The kernel-level module 110 temporarily stores the digitized pulse data until it is transferred to a user-space program 112. User-space programs are not integrated with the operating system, but instead are separate computer programs that run on an operating system and are subject to constraints imposed by the operating system. The operating system acts as an intermediary between user-space programs and corresponding computer hardware.

Figure 4:
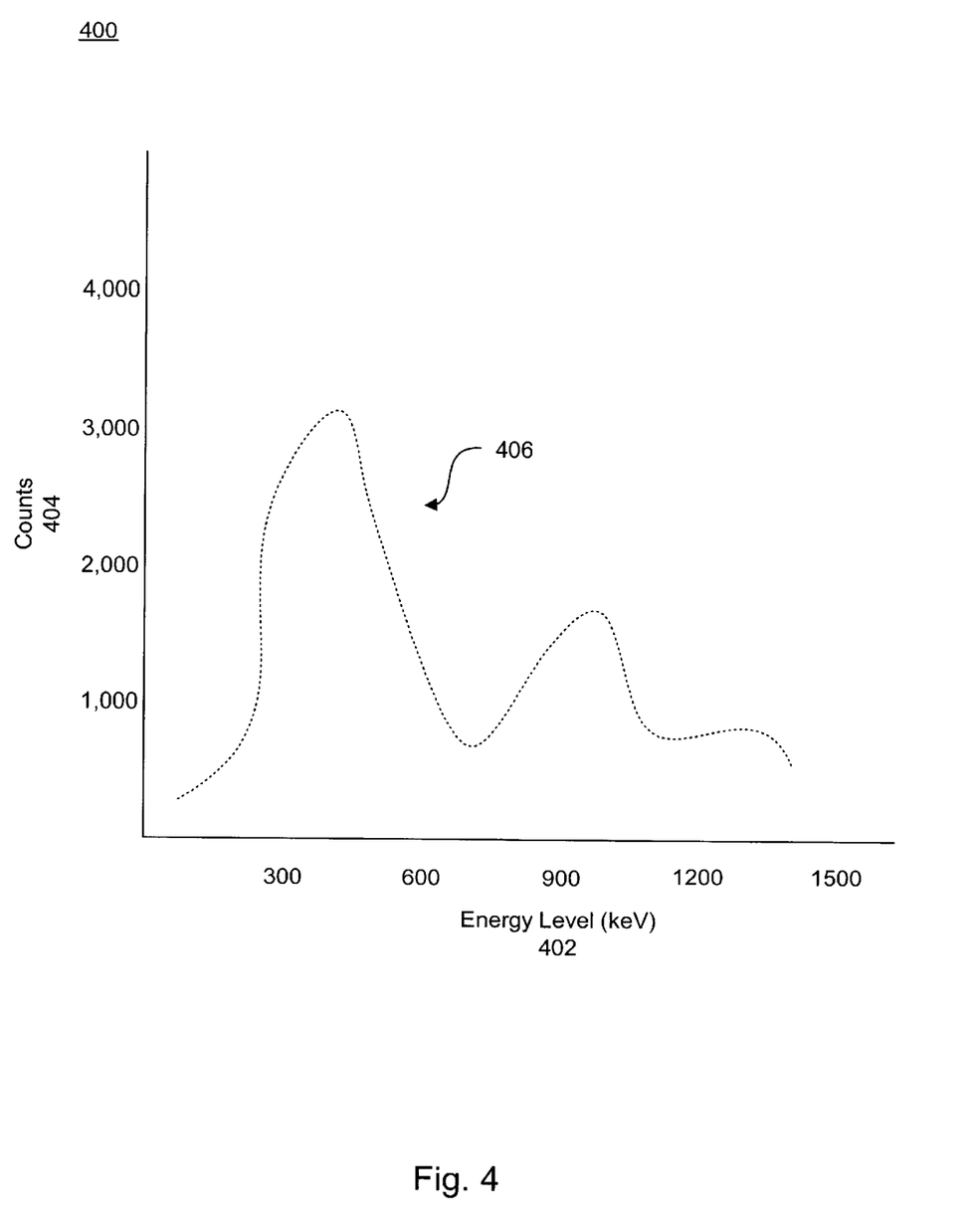
FIG. 4 illustrates a visual indication of the spectrographic pulse data produced by the Web-based multi-channel analyzer.

The user-space program 112 may perform numerous functions. For example, it may categorize the digitized pulse data into channels, producing categorized pulse data. Each channel represents an energy level range, usually measured in kiloelectron volts (KeVs). Thus, spectrographic pulse data is often displayed on a chart showing a number of pulses (or counts) that the detector 104 receives at a specific energy level range. As illustrated in FIG. 4, charts showing count levels at adjacent energy level ranges produce patterns that may be employed to examine, for example, the composition and thickness of the corresponding radioactive material.

In one embodiment, the user-space program 112 may receive user-specified controls pertaining to gathering and distribution of spectrographic pulse data. The user-specified controls may dictate many aspects of the Web-based MCA 102. For example, the user-specified controls may dictate the rudimentary aspects of the MCA 102, including memory range control (number of channels), start and stop collect, clear data, and the like. Most importantly, the MCA 102 accepts network socket connections and thus can be controlled by standard applications, such as Telnet. Employing these conventional, non-proprietary protocols, each aspect of the Web-based MCA 102 is customizable by an end-user.

The user-space program 112 may also format the categorized pulse data. In one embodiment, the categorized pulse data may be arranged into a non-proprietary format. One example of a non-proprietary format is Hypertext markup language (HTML), which language is frequently used in connection with Web pages on the World Wide Web. Non-proprietary formats are data formats or configurations that are not owned, controlled, or exclusively used by a particular entity or group of entities.

A network adapter 118 couples the MCA 102 to a network 120, such as the Internet. The Internet is a network of networks and is well-known and understood by those skilled in the art.

After formatting, the user-space program 112 may transmit the categorized pulse data to a network 120. In one embodiment, transmission may occur via non-proprietary transmission protocols. Non-proprietary transmission protocols are transmission protocols that are not owned, controlled, or exclusively used by a particular entity or group of entities. Thus, transmission may be effectuated, for example, by placing the categorized pulse data on a Web 114 or File Transfer Protocol (FTP) 116 server, and thus permitting transmission of the data employing the FTP or a hypertext transfer protocol (HTTP). As discussed in greater detail below, the Web-based MCA 102 may also format and transmit spectrographic pulse data with an e-mail message.

A computer 122, sometimes termed the remote computer 122, may be coupled to the network 120 and access the categorized pulse data. Also, a computer 122, sometimes termed an issuing computer 122, coupled to the network 120 may be employed to generate and deliver the user-specified controls to be Web-based MCA 102. In one embodiment, a Web browser 124 may be employed to view categorized pulse data generated by the MCA 102. Web browsers 124 include products such as Microsoft Internet Explorer™ produced by Microsoft Corporation and Netscape Navigator® produced by Netscape Communications Corporation.

Figure 2:
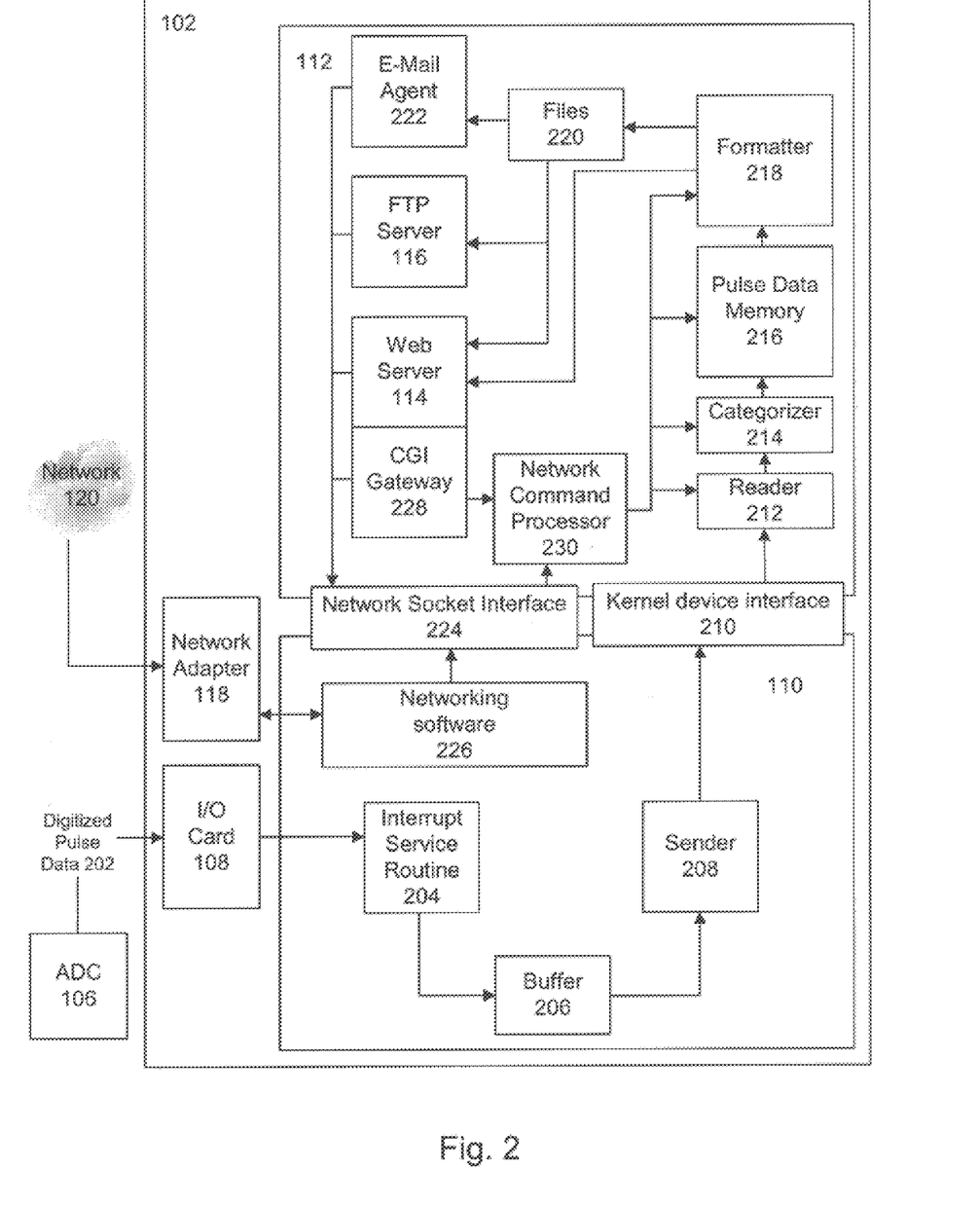
FIG. 2 is a schematic block diagram of one embodiment of software and hardware components employed by the Web-based multi-channel analyzer.

FIG. 2 is a schematic block diagram of one embodiment of the Web-based multi-channel analyzer 102. As stated above, in one implementation, the Web-based MCA 102 involves a kernel-level software module 110 and a user-space software module 112.

The digitized pulse data 202, received from an ADC 106, passes from the I/O card 108 into the kernel-level software module 110. In one embodiment, an interrupt service routine 204 responds to a hardware signal indicating that digitized pulse data 202 is available to be read from an ADC 106. Again, digitized pulse data 202 corresponds to conversion of an electronic pulse from spectroscopic hardware into digital form. The interrupt service routine 204 sends an interrupt signal to a processor running the operating system. The interrupt signal causes the processor to interrupt any tasks it may be performing and immediately handle the processes related to receiving the digitized pulse data 202.

The interrupt service routine 204 is implemented at the kernel level to ensure that the Web-based MCA 102 can respond quickly to an interrupt signal and process digitized data for at least 10,000 pulses per second. As explained before, programs running in the user-space of an operating system are generally slower to respond to incoming signals. This rapid response time insures that spectrographic pulses will not be missed or "dropped," preserving the integrity of the spectrographic pulse data.

The interrupt service routine 204 reads digitized pulse data 202 and places it into a buffer 206. The digitized pulse data 202 may be stored in the buffer 206 between the time it is read by the interrupt service routine 204 and the time it is read by the user-space program 112. Ideally, the buffer 206 may be dynamically sized, depending on the rate of incoming data.

A sender software module 208 transmits digitized pulse data 202 from the kernel-level device driver 110 to the user-space module 112 via a kernel device interface 210. The data may be transmitted via, for example, a standard special character device (e.g., /dev/adc0 in Linux). In such an embodiment, the standard character special device interface employs standard interface techniques, such that the user may easily develop and implement customized user-space programs.

The reader software module 212 is a user-space program 112 and is designed to return a number of data conversions in one read, up to the maximum buffer-size provided by the user-space program 112. In the event that no data is available, this is indicated to the reader module 212.

In one implementation, a categorizer software module 214 receives and categorizes the digitized pulse data 202 into different channels, producing categorized pulse data. As stated before, the digitized pulse data is a number indicating the energy level of a spectrographic pulse, and each channel indicates an energy level range, usually measured in kilo-electron volts (KeVs), into which a digitized pulse may fall. In one embodiment, the reader 212 and categorizer 214 software modules may comprise an integrated software module. The categorized pulse data is stored in the pulse data memory 216 until the pulse data is processed by a formatter software module 218.

In an alternative embodiment, the categorizer software module 214 may be implemented within the kernel software module 110. In particular, the categorizer software module 214 may be in electrical communication with the interrupt service routine 204 and the buffer 206 such that the digitized pulse data 202 is categorized before it is stored in the buffer 206.

A formatter software module 218 prepares the pulse data to be transmitted. The formatter software module 218 may, in one embodiment, format the categorized pulse data into a non-proprietary format in accordance with user-specified controls. In a non-proprietary format, the pulse data is easily accessible employing standard techniques, such as those commonly used in connection with the Internet. For example, the formatter module 218 may format the categorized pulse data into a file 220 that may be transmitted to the end-user employing an e-mail agent 222, FTP server 116 or Web server 114. The categorized pulse data may be formatted into Hypertext mark-up language (HTML) and placed on the Web server 114. The formatting module 218 may format the pulse data into a form-based Web page.

The formatter software module 218 may format the categorized pulse data into a visual indication 400, which is illustrated in FIG. 4. The visual indication 400 may comprise a static image formatted into non-proprietary graphical file formats, such as a .png or .jpeg file format. The visual indication 400 is discussed in greater detail in connection with FIG. 4.

After it has been formatted, the categorized pulse data may be transmitted to a network 120 through the network socket interface 224, networking software 226, and network adapter 118. Distribution techniques, such as e-mail agents 222, FTP 116 or Web servers 114, are employed so that the data can easily be accessed and manipulated by end-users. As stated above, in one embodiment, transmission may occur via non-proprietary transmission protocols, such as the FTP and HTTP transfer protocols. Thus, an end-user may access the data employing a standard Web browser 124 on a computer 122 coupled to the network 120. In one embodiment, the pulse data could be e-mailed to a specific e-mail address or set of addresses at completion of a data acquisition cycle. The Web-based MCA 102 also provides the capability to stream raw data via a network connection, such as a transmission control protocol/internet protocol (TCP/IP) connection, allowing multiple remote applications to receive the data stream. This includes streaming numeric data out via network connection to remote applications, or streaming the data out in a live image format (an image that changes as additional data is received).

The Web-based MCA 102 may be controlled through a network 120, such as the Internet. Network communications may be received by a network adapter 118, processed by networking software 226, and transmitted to a user-space software module by a network socket interface 224. In one implementation, network command processor software module 230 is coupled to the network socket interface 224 and distributes the user-specified controls to the remaining software modules. For example, the network command processor 230 places the unit into a collect mode to acquire spectrographic pulse data. The network command processor 230 receives connections via standard TCP/IP network sockets, and thus can be controlled remotely or respond to, for example, commands generated as part of a Web server's 114 common gateway interface (CGI) 228. In one implementation, Web-based MCA 102 employs standard UNIX and Internet technologies such that end-users have the ability to customize the Web-MCA 102 using any variety of high-level languages, including, for example, Pearl, C, HTML, Java, and shell scripts and/or applets. Also, it should be noted that the network command processor software module 230 can receive commands that may be stored and executed at a later time such that the Web-based MCA 102 may execute a predetermined sequence of steps without direct real-time control.

Figure 3:
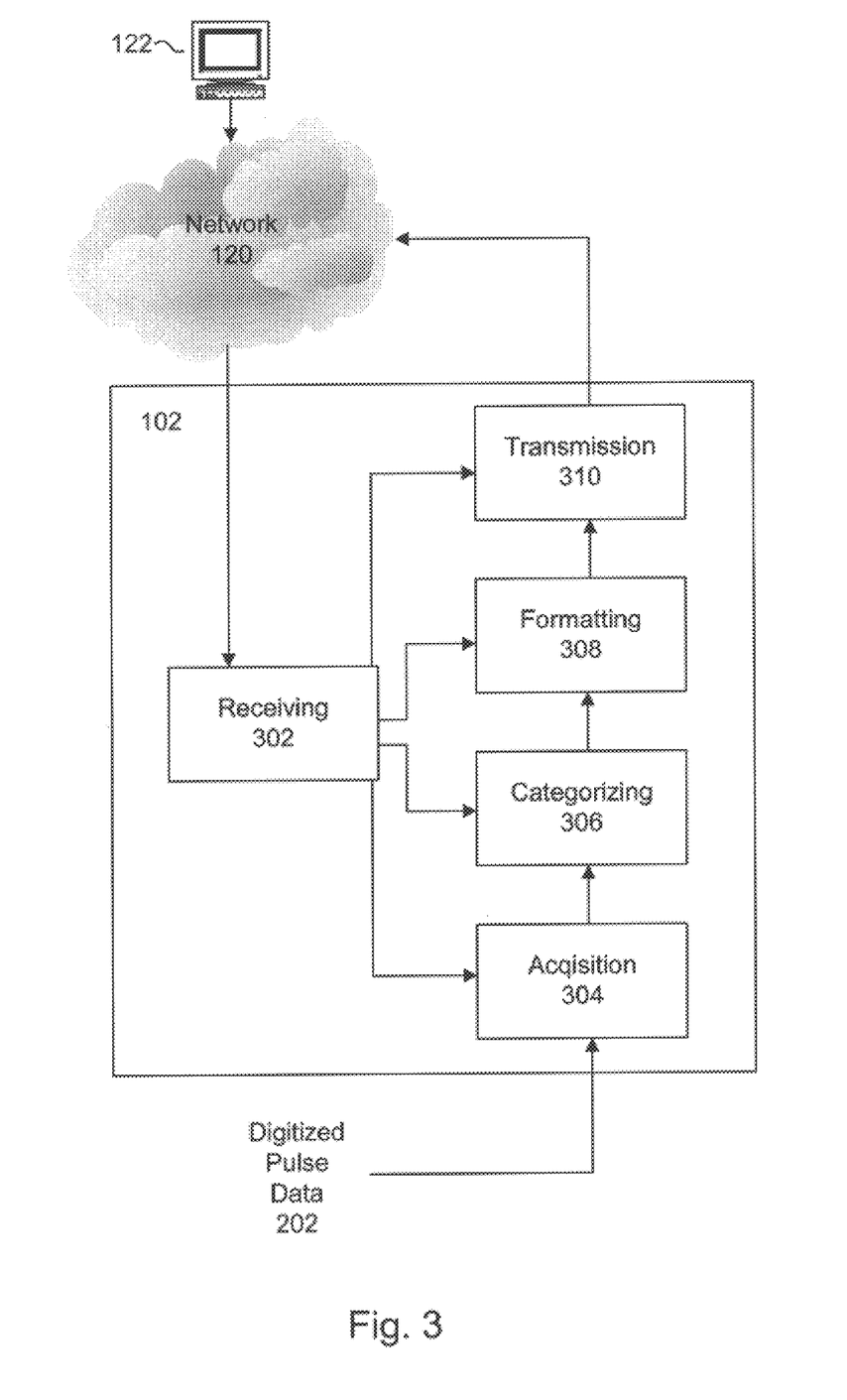
FIG. 3 is a block diagram of logical components of one embodiment of the Web-based multi-channel analyzer.

FIG. 3 is a block diagram of logical components of one embodiment of the Web-based multi-channel analyzer 102. The depicted logical components may be implemented using one or more of the physical components described above. Additionally, or in the alternative, various logical components may be implemented as software modules. Those skilled in the art will recognize that various illustrated components may be combined together or integrated with standard components in various configurations without departing from the scope or spirit of the invention.

As stated above, the Web-based MCA 102 may be coupled to a computer 122 through a network 120. At the computer 122, sometimes termed an issuing computer 122, the end-user may delineate user-specified controls. The user-specified controls may be transmitted to the Web-based MCA 102 via a network 120. In one embodiment, the issuing computer 122 may establish a Telnet connection with the Web-based MCA 102, thereby allowing the end-user to control the Web-based MCA 102 as if the end-user were locally attached. Again, such a connection enables the end-user to easily customize and configure each aspect of the Web-based MCA 102.

The user-specified controls are received by a receiving component 302 from the network 120. The user-specified controls pertain to collectible pulse data, i.e., pulse data that has not yet been acquired. The receiving component 302 may be accessed and controlled using conventional technologies such as those enumerated above, thus enabling the end-user to easily access and manipulate the Web-based MCA 102. For example, user-specified controls may take the form of various scripts and/or applets (e.g., a Pearl, C., HTML, Java, or shell scripts and/or applets), in addition to the Telnet connection described above. As a consequence, each component of the Web-based MCA 102 may be customized by an end-user. In one implementation, default controls may be employed when no specific controls have been set by the user. The receiving component 302 could be implemented, for example, employing the network command processor 230, network socket interface 224, networking software 226, and network adapter 118.

An acquisition component 304 may acquire digitized pulse data 202 in accordance with user-specified controls. In one embodiment, the acquisition component 304 is integrated with a general-purpose operating system and is capable of acquiring digitized pulse data 202 for at least 10,000 pulses per second. The acquisition component 304 may be integrated with an open-source operating system. Again, a Linux embedded operating system is an example of such an operating system. As such, the end-user has access to source code of the operating system, and thus the acquisition component 304 may be completely customized by an end-user. One example of an acquisition component 304 is the kernel-level device driver 110 described in connection with FIGS. 1 and 2. An acquisition component 304 could further include hardware, such as the I/O card 108.

After the digitized pulse data 202 has been acquired by the acquisition component 304, the categorizing component 306 may categorize the digitized pulse data 202 into channels. In one embodiment, the user may specify the breath of the energy level of each channel (e.g., 1.5 KeVs per channel), or may simply employ a default setting as to the breath of the channel.

The formatting component 308 prepares the categorized pulse data to be distributed. Again, user-specified controls may control the formatting process. The formatting component 308 may, in one embodiment, format the categorized pulse data into a non-proprietary format, making the data is easily accessible to the end-user. For example, the formatting component 308 may format the categorized pulse data into a file 220 that may be transmitted to the user employing an e-mail agent 222, FTP server 116 or Web server 114, as described above. As also explained before, the categorized pulse data may be formatted to allow transmission employing various streaming techniques (e.g., live images formats or streaming raw data to a TCP/IP address). Thus, the formatting component 308 may prepare the categorized pulse data for streaming, often, in accordance with user-specified controls.

The formatting component 308 may format the categorized pulse data into a visual indication 400 thereof. Again, the visual indication 400 is discussed in greater detail in connection with FIG. 4.

The transmission component 310 may transfer the categorized pulse data to the network 120. In one embodiment, the transmission component 310 may transmit the categorized pulse data via non-proprietary transmission protocols, such as the streaming, e-mail, FTP and HTTP transfer protocols discussed above. By way of an additional example, the transmission component 310 may place the categorized pulse data, formatted into an HTML format, onto a Web server 114, thus making the categorized pulse data viewable by a remote computer 122 in communication with the network 120 through use of a Web browser.

FIG. 4 illustrates a visual indication 400 of categorized pulse data produced by the Web-based multi-channel analyzer 102. As delineated by user-specified controls, the visual indication 400 may be live (change as additional data is received) or static.

In one embodiment, the visual indication 400 comprises a first and second axes and at least one point 406. The first axis corresponds to a plurality of energy levels 402, and the second axis corresponds to a plurality of counts 404, each point 406 indicating a count corresponding to a specific energy level 402. By analyzing relationships between count levels that various energy levels 402, experts in the field, either in an automated or manual fashion, make educated determinations as to the source of the spectrographic pulse data. Other examples of visual indications 400 of spectrographic pulse data include bar graphs or similar charts for displaying the number of counts received within a specific channel.

In an alternative embodiment, the visual indication 400 may implement multi-channel scaling. In such an embodiment, one axis corresponds to counts above a specified energy level while the other axis corresponds to time intervals. The time intervals may be, in one embodiment, regular and/or sequential. Thus, the number of counts within a specific time interval are shown on the visual indication 400.

The Web-based MCA represents a substantial advancement in the art of spectrographic pulse data analysis. Because the Web-based MCA is integrated with a general-purpose, open-source operating system, it may easily be configured and customized by the end-user. Moreover, because of this integration, data produced by the Web-based MCA may be formatted into non-proprietary data formats and may easily be accessed employing standard communication protocols, enabling the user to easily manipulate and customized the Web-based MCA and the data produced thereby.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method for processing and distributing spectrographic pulse data, comprising:

receiving user-specified controls pertaining to collectible pulse data;

acquiring digitized pulse data through kernel-level acquisition component, the acquisition component integrated with a general-purpose operating system that performs functions other than multichannel analysis and capable of acquiring digitized pulse data for at least 10,000 pulses per second;

categorizing the digitized pulse data into channels; and transmitting the categorized pulse data to a network.

2. The method of claim 1, wherein the general-purpose operating system further comprises an open-source operating system.

3. The method of claim 2, further comprising:

before transmitting, formatting the categorized pulse data into a non-proprietary format.

4. The method of claim 3, wherein the non-proprietary format is a hypertext markup language (HTML).

5. The method of claim 3, wherein the network is the Internet.

6. The method of claim 3, wherein formatting further comprises: arranging the categorized pulse data into a visual indication thereof.

7. The method of claim 6, wherein the visual indication comprises a first and second axes and at least one point, the first axis corresponding to a plurality of energy levels, the second axis corresponding to a plurality of counts, each point indicating a count corresponding to a specific energy level.

8. The method of claim 6, wherein the visual indication comprises a first and second axes and at least one point, the first axis corresponding to a plurality of time intervals, the second axis corresponding to a plurality of counts, each point indicating a count corresponding to a specific time interval.

9. The method of claim 3, further comprising:
viewing the categorized pulse data through use of a Web browser on a remote computer in communication with the network.

10. The method of claim 3, wherein transmitting further comprises:
sending the categorized pulse data to a computer in communication with the network employing a non-proprietary transmission protocol.

11. The method of claim 10, wherein the transmission protocol is selected from a group consisting of a File Transfer Protocol (FTP) and a HyperText Transfer Protocol (HTTP).

12. The method of claim 10, wherein transmitting further comprises:
sending the categorized pulse data with an e-mail message to a computer.

13. The method of claim 10, wherein transmitting further comprises:
streaming the categorized pulse data in real-time to a computer in communication with the network.

14. The method of claim 3, wherein receiving further comprises:
obtaining the user-specified controls from an issuing computer in communication with the network.

15. The method of claim 3, wherein receiving comprises:
obtaining the user-specified controls via a telnet connection with an issuing computer in communication with the network.

16. The method of claim 3, wherein the user-specified controls are generated by a script.

17. A computer-readable medium having computer-executable instructions for performing a method of processing and distributing spectrographic pulse data, the method comprising:
receiving user-specified controls pertaining to collectible pulse data;
acquiring digitized pulse data through kernel-level acquisition component, the acquisition component integrated with a general-purpose operating system that performs functions other than multi-channel analysis and capable of acquiring digitized pulse data for at least 10,000 pulses per second;
categorizing the digitized pulse data into channels; and
transmitting the categorized pulse data to a network.

18. The computer-readable medium of claim 17, wherein the general-purpose operating system comprises an open-source operating system.

19. The computer-readable medium of claim 18, further comprising:
before transmitting, formatting the categorized pulse data into a non-proprietary format.

20. The computer-readable medium of claim 19, wherein the non-proprietary format is a hypertext markup language (HTML).

21. The computer-readable medium of claim 19, wherein the network is the Internet.

22. The computer-readable medium of claim 19, wherein formatting further comprises:
arranging the categorized pulse data into a visual indication thereof.

23. The computer-readable medium of claim 22, wherein the visual indication comprises a first and second axes and at least one point, the first axis corresponding to a plurality of energy levels, the second axis corresponding to a plurality of counts, each point indicating a count corresponding to a specific energy level.

24. The computer-readable medium of claim 19, wherein, after transmitting, the categorized pulse data is viewable by a remote computer in communication with the network through use of a Web browser.

25. The computer-readable medium of claim 19, wherein transmitting further comprises:
sending the categorized pulse data to the computer in communication with the network employing a non-proprietary transmission protocol.

26. The computer-readable medium of claim 25, wherein the transmission protocol is selected from a group consisting of a File Transfer Protocol (FTP) and a HyperText Transfer Protocol (HTTP).

27. The computer-readable medium of claim 25, wherein transmitting further comprises:
sending the categorized pulse data with an e-mail message to a computer.

28. The computer-readable medium of claim 25, wherein transmitting further comprises:
streaming the categorized pulse data in real-time to a computer in communication with the network.

29. The computer-readable medium of claim 19, wherein receiving further comprises:
obtaining the user-specified controls from an issuing computer in communication with the network.

30. The computer-readable medium of claim 19, wherein receiving further comprises:
obtaining the user-specified controls via a telnet connection with an issuing computer in communication with the network.

31. A system for processing and distributing spectrographic pulse data, comprising:
a receiving component configured to receive user-specified controls pertaining to collectible pulse data;
kernel-level acquisition component configured to acquire digitized pulse data, the acquisition component integrated with a general-purpose operating system that performs functions other than multichannel analysis and capable of acquiring digitized pulse data for at least 10,000 pulses per second;
a categorizing component configured to categorize the digitized pulse data into channels; and
a transmission component configured to transmit the categorized pulse data to a network for receipt by a remote computer.

32. The system of claim 31, wherein the general-purpose operating system further comprises an open-source operating system.

33. The system of claim 32, wherein the acquisition component is integrated with the open-source operating system such that the acquisition component is customizable by an end-user.

34. The system of claim 32, further comprising:
a formatting component configured to format, before transmitting, the categorized pulse data into a non-proprietary format.

35. The system of claim 34, wherein the categorizing component, the formatting component, and the transmission component are configured to be customizable by an end-user.

36. The system of claim 34, wherein the network is the Internet.

37. The system of claim 34, wherein the non-proprietary format is hypertext markup language (HTML).

38. The system of claim 34, wherein the formatting component is configured to format the categorized pulse data into a visual indication thereof.

39. The system of claim 38, wherein the visual indication comprises a first and second axes and at least one point, the first axis corresponding to a plurality of energy levels, the second axis corresponding to a plurality of counts, each point indicating a count corresponding to a specific energy level.

40. The system of claim 34, wherein the transmission component and formatting component are configured such that, after transmitting, the categorized pulse data is viewable by a remote computer in communication with the network through use of a Web browser.

41. The system of claim 34, wherein the transmission component is configured to send the categorized pulse data to a remote computer employing a non-proprietary file transmission protocol.

42. The system of claim 41, wherein the transmission protocol is selected from a group consisting of a File Transfer Protocol (FTP) and a HyperText Transfer Protocol (HTTP).

43. The system of claim 41, wherein the transmission component is configured to send the categorized pulse data with an e-mail message to the remote computer.

44. The system of claim 41, wherein the transmission component is configured to stream the categorized pulse data in real-time to the remote computer.

45. The system of claim 34, wherein the receiving component is configured to obtain the user-specified controls from an issuing computer in communication with the network.

46. The system of claim 34, wherein the receiving component is configured to obtain the user-specified controls via a telnet connection with an issuing computer in communication with the network.

* * * * *